US006706677B2

(12) United States Patent
Burns et al.

(10) Patent No.: US 6,706,677 B2
(45) Date of Patent: Mar. 16, 2004

(54) BLEACHING IN CONJUNCTION WITH A LIPOPHILIC FLUID CLEANING REGIMEN

(75) Inventors: Michael Eugene Burns, West Chester, OH (US); John Christian Haught, West Chester, OH (US)

(73) Assignee: Procter & Gamble Company, Cincinnati, OH (US)

(*) Notice: Subject to any disclaimer, the term of this patent is extended or adjusted under 35 U.S.C. 154(b) by 529 days.

(21) Appl. No.: 09/849,553

(22) Filed: May 4, 2001

(65) Prior Publication Data

US 2002/0004950 A1 Jan. 17, 2002

Related U.S. Application Data

(60) Provisional application No. 60/209,250, filed on Jun. 5, 2000, provisional application No. 60/209,468, filed on Jun. 5, 2000, provisional application No. 60/209,443, filed on Jun. 5, 2000, provisional application No. 60/209,444, filed on Jun. 5, 2000, and provisional application No. 60/248,023, filed on Nov. 13, 2000.

(51) Int. Cl.[7] .............. C11D 1/02; C11D 3/00; C11D 7/18; C11D 7/54; C11D 3/295

(52) U.S. Cl. .............. 510/286; 510/285; 510/367

(58) Field of Search .................. 510/367, 286

(56) References Cited

U.S. PATENT DOCUMENTS

| | | |
|---|---|---|
| 4,097,397 A | 6/1978 | Mizutani et al. |
| 4,102,824 A | 7/1978 | Mizutani et al. |
| 4,267,077 A | 5/1981 | Niimi et al. |
| 4,708,807 A | 11/1987 | Kemerer |
| 4,909,962 A | 3/1990 | Clark |
| 5,037,485 A | 8/1991 | Chromecek et al. |
| 5,116,426 A | 5/1992 | Asano et al. |
| 5,271,775 A | 12/1993 | Asano et al. |
| 5,302,313 A | 4/1994 | Asano et al. |
| 5,360,571 A | 11/1994 | Kilgour et al. |
| 5,443,747 A | 8/1995 | Inada et al. |
| 5,503,681 A | 4/1996 | Inada et al. |
| 5,503,778 A | 4/1996 | Liu et al. |
| 5,520,827 A | 5/1996 | Danner |
| 5,593,507 A | 1/1997 | Inada et al. |
| 5,597,792 A | 1/1997 | Klier et al. |
| 5,628,833 A | 5/1997 | McCormack et al. |
| 5,676,705 A | 10/1997 | Jureller et al. |
| 5,683,473 A | 11/1997 | Jureller et al. |
| 5,683,977 A | 11/1997 | Jureller et al. |
| 5,690,750 A | 11/1997 | Inada et al. |
| 5,705,562 A | 1/1998 | Hill |
| 5,707,613 A | 1/1998 | Hill |
| 5,716,456 A | 2/1998 | Inada et al. |
| 5,722,781 A | 3/1998 | Yamaguchi |
| 5,741,365 A | 4/1998 | Inada et al. |
| 5,769,962 A | 6/1998 | Inada et al. |
| 5,783,092 A | 7/1998 | Brown et al. |
| 5,811,383 A | 9/1998 | Klier et al. |
| 5,858,022 A | 1/1999 | Romack et al. |
| 5,865,852 A | 2/1999 | Berndt |
| 5,866,005 A | 2/1999 | DeSimone et al. |
| 5,876,510 A | 3/1999 | Kuemin et al. |
| 5,877,133 A | 3/1999 | Good |
| 5,888,250 A | 3/1999 | Hayday et al. |
| 5,929,012 A | 7/1999 | Del Duca et al. |
| 5,942,007 A | 8/1999 | Berndt et al. |
| 5,944,996 A | 8/1999 | DeSimone et al. |
| 5,954,869 A | 9/1999 | Elfersy et al. |
| 5,977,040 A | 11/1999 | Inada et al. |
| 5,977,045 A | 11/1999 | Murphy |
| 5,985,810 A | 11/1999 | Inada et al. |
| 6,013,683 A | 1/2000 | Hill et al. |
| 6,042,617 A | 3/2000 | Berndt |
| 6,042,618 A | 3/2000 | Berndt et al. |
| 6,056,789 A | 5/2000 | Berndt et al. |
| 6,059,845 A | 5/2000 | Berndt et al. |
| 6,060,546 A | 5/2000 | Powell et al. |
| 6,063,135 A | 5/2000 | Berndt et al. |
| 6,086,635 A | 7/2000 | Berndt et al. |
| 6,114,295 A | 9/2000 | Murphy |

(List continued on next page.)

FOREIGN PATENT DOCUMENTS

| | | |
|---|---|---|
| CA | 1 239 326 | 7/1988 |
| EP | 0 479 146 B1 | 12/1996 |
| EP | 1 041 189 A1 | 10/2000 |
| EP | 1 092 803 A1 | 4/2001 |
| JP | 1098-798 A | 4/1989 |
| JP | 1188-595 A | 7/1989 |
| JP | 2166-198 A | 6/1990 |
| JP | 2202-599 A | 8/1990 |
| JP | 2222-496 A | 9/1990 |
| JP | 3046-300 A | 2/1991 |
| JP | 3063-799 A | 3/1991 |
| JP | 04323299 A | 11/1992 |
| JP | 05051598 A | 3/1993 |
| JP | 05239766 A | 9/1993 |
| JP | 08073837 A | 3/1996 |
| JP | 09143497 A | 6/1997 |
| JP | 10-017891 | 1/1998 |
| JP | 11-092784 | 4/1999 |
| JP | 11-323381 | 11/1999 |
| JP | 11-323383 | 11/1999 |

(List continued on next page.)

OTHER PUBLICATIONS

US 6,001,133, 12/1999, DeYoung et al. (withdrawn)
Trilo et al.; "Critical Micelle Density for the Self–Assembly of Block Copolymer Surfactants in Supercritical Carbon Dioxide"; pp. 416–421.
Sarbu et al.; "Non–Fluorous Polymers with Very High Solubility in Supercritical $CO_2$ Down to Low Pressures"; pp. 165–168.

Primary Examiner—Mark Kopec
Assistant Examiner—John M Petruncio
(74) Attorney, Agent, or Firm—Caroline Wei-Berk; C. Brant Cook; Kim W. Zerby

(57) ABSTRACT

The present invention relates to methods to treat fabrics with lipophilic fluid and bleaching agents. The present invention is also directed to compositions containing lipophilic fluid and bleaching agents.

24 Claims, No Drawings

| U.S. PATENT DOCUMENTS | | | | FOREIGN PATENT DOCUMENTS | | |
|---|---|---|---|---|---|---|
| 6,131,421 A | 10/2000 | Jureller et al. | | JP | 00144175 A | 5/2000 |
| 6,136,766 A | 10/2000 | Inada et al. | | JP | 2000-192085 | 7/2000 |
| 6,148,644 A | 11/2000 | Jureller et al. | | JP | 00290689 A | 10/2000 |
| 6,156,074 A | 12/2000 | Hayday et al. | | WO | WO 99/57358 | 11/1999 |
| 6,177,399 B1 | 1/2001 | Mei et al. | | WO | WO 00/04221 | 1/2000 |
| 6,200,352 B1 | 3/2001 | Romack et al. | | WO | WO 00/04222 | 1/2000 |
| 6,200,393 B1 | 3/2001 | Romack et al. | | WO | WO 00/63340 | 10/2000 |
| 6,200,943 B1 | 3/2001 | Romack et al. | | WO | WO 01/06051 A1 | 1/2001 |
| 6,204,233 B1 | 3/2001 | Smith et al. | | WO | WO 01/34613 A1 | 5/2001 |
| 6,228,826 B1 | 5/2001 | DeYoung et al. | | WO | WO 01/34706 A1 | 5/2001 |
| 6,242,408 B1 | 6/2001 | Elms et al. | | WO | WO 01/40567 A1 | 6/2001 |

…

BLEACHING IN CONJUNCTION WITH A LIPOPHILIC FLUID CLEANING REGIMEN

CROSS REFERENCE TO RELATED APPLICATIONS

This application claims priority under Title 35, United States Code 119(e) from Provisional Application Ser. Nos. 60/209,250; 60/209,468; 60/209,443; and 60/209,444 all filed on Jun. 5, 2000; and 60/248,023, filed on Nov. 13, 2000.

FIELD OF THE INVENTION

The present invention relates to methods to treat fabrics with lipophilic fluid and bleaching agents. The present invention is also directed to compositions containing lipophilic fluid and bleaching agents.

BACKGROUND OF THE INVENTION

Conventional laundering techniques for the cleaning and treatment of fabric articles such as garments have long involved both traditional aqueous based washing and a technique commonly referred to as "dry cleaning". Traditional aqueous based washing techniques have involved immersion of the fabric articles in a solution of water and detergent or soap products followed by rinsing and drying. However, such conventional immersion cleaning techniques have proven unsatisfactory on a wide range fabric articles that require special handling and/or cleaning methods due to fabric content, construction, etceteras, that is unsuitable for immersion in water.

Accordingly, the use of the laundering method of "dry cleaning" has been developed. Dry cleaning typically involves the use of non-aqueous, lipophilic fluids as the solvent or solution for cleaning. While the absence of water permits the cleaning of fabrics without the potential disastrous side effects water may present, these lipophilic fluids do not perform well on hydrophilic and/or combination soils.

Because these lipophilic fluids are typically used in "neat" form (i.e. they contain no additional additives), dry cleaners must often perform pre-treating and/or pre-spotting to remove tough soils from fabrics prior to the dry cleaning cycle. Further, nothing is typically added to boost "whiteness" or "brightness" in fabrics that are dry-cleaned as can be observed from "dingy" or "dull" fabrics returned from a dry cleaner. It would be desirable to add bleaching to the lipophilic fluid treatment regimen in order to increase the lipophilic fluids' brightening, whitening, and/or soil removal capability thereby reducing or eliminating the need for pre-treating and/or pre-spotting.

Accordingly, the need remains for bleach-containing care and treatment regimens for use with lipophilic fluid compositions. These regimens should be capable of delivering enhanced brightening, whitening, and/or soil removal.

SUMMARY OF THE INVENTION

This need is met by the present invention wherein bleach-containing care and treatment regimens and compositions for use with lipophilic fluid compositions are disclosed. These regimens and/or compositions are capable of delivering enhanced brightening, whitening, and/or soil removal.

The present invention is directed to a method for attaining improved fabric cleaning in a lipophilic fluid treatment regimen, wherein the method includes the steps of exposing the fabric to a lipophilic fluid and exposing the fabric to a bleach system.

The present invention is also directed to a composition for attaining improved fabric cleaning in a lipophilic fluid treatment regimen, wherein the composition includes a lipophilic fluid and a bleach system.

These and other aspects, features and advantages will become apparent to those of ordinary skill in the art from a reading of the following detailed description and the appended claims. All percentages, ratios and proportions herein are by weight, unless otherwise specified. All temperatures are in degrees Celsius (° C.) unless otherwise specified. All measurements are in SI units unless otherwise specified. All documents cited are in relevant part, incorporated herein by reference.

DETAILED DESCRIPTION OF THE INVENTION

Definitions

The term "fabrics" and "fabric" used herein is intended to mean any article that is customarily cleaned in a conventional laundry process or in a dry cleaning process. As such the term encompasses articles of clothing, linen, drapery, and clothing accessories. The term also encompasses other items made in whole or in part of fabric, such as tote bags, furniture covers, tarpaulins and the like.

The term "bleach system" used herein is intended to mean any formulation that contains one or more bleaching agents. Nonlimiting examples of bleaching agents include bleaches, both oxygen and chlorine bleaches, preferably oxygen bleaches, bleach activators, organic peroxides, bleach catalysts, especially metal-containing bleach catalysts, bleach boosting compounds, bleach pre-cursors, as sources of hydrogen peroxide, photobleaches, and bleaching enzymes.

The term "AvO" used herein is intended to mean "available oxygen" as determined by the standard iodometric method (as described for instance in Methoden der Organischen Chemie, Houben Weyl, 1953, Vol. 2, page 562, herein incorporated by reference), a suitable method to determine the available oxygen (AvO) content of a composition.

The term "polar component" used herein is intended to mean all materials that are miscible in water. Non-limiting examples include water, lower alcohols, glycols, glycol ethers, ethers, and combinations of these materials.

The phrase "dry weight of a fabric article" as used herein means the weight of a fabric article that has no intentionally added fluid weight.

The phrase "absorption capacity of a fabric article" as used herein means the maximum quantity of fluid that can be taken in and retained by a fabric article in its pores and interstices. Absorption capacity of a fabric article is measured in accordance with the following Test Protocol for Measuring Absorption Capacity of a Fabric Article.

Step 1: Rinse and dry a reservoir or other container into which a lipophilic fluid will be added. The reservoir is cleaned to free it from all extraneous matter, particularly soaps, detergents and wetting agents.

Step 2: Weigh a "dry" fabric article to be tested to obtain the "dry" fabric article's weight.

Step 3: Pour 2L of a lipophilic fluid at ~20C. into the reservoir.

Step 4: Place fabric article from Step 2 into the lipophilic fluid-containing reservoir.

Step 5: Agitate the fabric article within the reservoir to ensure no air pockets are left inside the fabric article and it is thoroughly wetted with the lipophilic fluid.

Step 6: Remove the fabric article from the lipophilic fluid-containing reservoir.

Step 7: Unfold the fabric article, if necessary, so that there is no contact between same or opposite fabric article surfaces.

Step 8: Let the fabric article from Step 7 drip until the drop frequency does not exceed 1 drop/sec.

Step 9: Weigh the "wet" fabric article from Step 8 to obtain the "wet" fabric article's weight.

Step 10: Calculate the amount of lipophilic fluid absorbed for the fabric article using the equation below.

$$FA=(W-D)/D*100$$

where:
FA=fluid absorbed, % (i.e., the absorption capacity of the fabric article in terms of % by dry weight of the fabric article)
W=wet specimen weight, g
D=initial specimen weight, g By the term "non-immersive" it is meant that essentially all of the fluid is in intimate contact with the fabric articles. There is at most minimal amounts of "free" wash liquor. It is unlike an "immersive" process where the washing fluid is a bath in which the fabric articles are either submerged, as in a conventional vertical axis washing machine, or plunged into, as in a conventional horizontal washing machine. The term "non-immersive" is defined in greater detail according to the following Test Protocol for Non-Immersive Processes. A process in which a fabric article is contacted by a fluid is a non-immersive process when the following Test Protocol for Non-Immersive Processes satisfied.

Step 1: Determine absorption capacity of a fabric specimen using Test Protocol for Measuring Absorption Capacity of a Fabric Article, described above.

Step 2: Subject a fabric article to a fluid contacting process such that a quantity of the fluid contacts the fabric article.

Step 3: Place a dry fabric specimen from Step 1 in proximity to the fabric article of Step 2 and move/agitate/tumble the fabric article and fabric specimen such that fluid transfer from the fabric article to the fabric specimen takes place (the fabric article and fabric specimen must achieve the same saturation level).

Step 4: Weigh the fabric specimen from Step 3.

Step 5: Calculate the fluid absorbed by the fabric specimen using the following equation:

$$FA=(W-D)/D* 100$$

where:
FA=fluid absorbed, %
W=wet specimen weight, g
D=initial specimen weight, g Step 6: Compare the fluid absorbed by the fabric specimen with the absorption capacity of the fabric specimen. The process is non-immersive if the fluid absorbed by the fabric specimen is less than about 0.8 of the absorption capacity of the fabric specimen.

Furthermore, all adjunct ingredients such as surfactants, bleaches, and the like may be added either prior to fabric application (directly into the lipophilic fluid and/or polar component and/or bleach system) or at some point during fabric application. These optional adjunct ingredients are described in more detail below.

Lipophilic Fluid

The lipophilic fluid herein is one having a liquid phase present under operating conditions. In general such a fluid can be fully liquid at ambient temperature and pressure, can be an easily melted solid, e.g., one which becomes liquid at temperatures in the range from about 0 deg. C. to about 60 deg. C., or can comprise a mixture of liquid and vapor phases at ambient temperatures and pressures, e.g., at 25 deg. C. and 1 atm. pressure. Thus, the essential lipophilic fluid is not a compressible gas such as carbon dioxide. It is preferred that the lipophilic fluid herein be inflammable or, have relatively high flash points and/or low VOC characteristics, these terms having their conventional meanings as used in the dry cleaning industry, to equal or, preferably, exceed the characteristics of known conventional dry cleaning fluids.

Suitable lipophilic fluids herein readily flow and are non-viscous. In general, the lipophilic fluids herein are required to be fluids capable of at least partially dissolving sebum or body soil as defined in the test hereinafter. Mixtures of lipophilic fluid are also suitable, and provided that the requirements of the test are met, the lipophilic fluid can include any fraction of dry-cleaning solvents, especially newer types including non-fluorinated solvents, or perfluorinated amines. Some perfluorinated amines such as perfluorotributylamines while unsuitable for use as lipohilic fluid may be present as one of many possible adjuncts present in the lipohilic fluid. Other suitable lipohilic fluids include diol solvent systems e.g., higher diols such as C6- or C8- or higher diols; organosilicon solvents including both cyclic and acyclic types, and the like; and mixtures thereof.

A preferred group of nonaqueous liquids suitable for incorporation as the major component of the lipophilic fluid includes low-volatility non-fluorinated organics, silicones, especially those other than amino-functional silicones, and mixtures thereof. Low volatility nonfluorinated organics include for example OLEAN and other polyol esters, or certain relatively nonvolatile biodegradable mid-chain branched petroleum fractions. Suitable silicones for use as a major component, e.g., more than 50%, of the lipophilic fluid include cyclopentasiloxane, sometimes termed "D5", or linear analogs having approximately similar volatility, optionally complemented by other compatible silicones. Suitable silicones are well known in the literature, see, for example, Kirk Othmer's Encyclopedia of Chemical Technology, and are available from a number of commercial sources, including General Electric, Toshiba Silicone, Bayer, and Dow Corning. Other suitable fluids are commercially available from Procter & Gamble or from Dow Chemical and other suppliers. For example one suitable silicone is SF-1528 available from GE silicone fluids. It is worth noting that SF-1528 fluid is 90% cyclopentasiloxane (D5).

Depending on the nature of treatment the lipophilic fluid may be removed mechanically, evaporatively, or any combination thereof. For example, if the purpose of the treatment is to provide cleaning it will be desirable to mechanically remove from the fabric articles at least 50% of the textile treatment liquid, for example by spinning. On the other hand, if the purpose of the treatment is to deposit a conditioning agent into the fabric, the liquid is preferably removed evaporatively.

Qualification of Lipophilic Fluid—Lipophilic Fluid Test (LF Test)

Any non-aqueous fluid that is both capable of meeting known requirements for a dry-cleaning fluid (e.g., flash point etc.) and is capable of at least partially dissolving sebum, as indicated by the test method described below, is suitable as a lipophilic fluid herein. The ability of a particular material to remove sebum can be measured by any known technique. As a general guideline, perfluorobutylamine (Fluorinert FC-43®) on its own (with or without adjuncts) is a reference material that, by definition, is unsuitable as the lipophilic fluid herein (it is essentially a non-solvent) while D5 dissolves sebum.

The following is the method for investigating and qualifying other materials, e.g., other low-viscosity, free-flowing silicones, for use as the lipophilic fluid. The method uses commercially available Crisco® canola oil, oleic acid (95% pure, available from Sigma Aldrich Co.) and squalene (99% pure, available from J. T. Baker) as model soils for sebum. The test materials should be substantially anhydrous and free from any added adjuncts, or other materials during evaluation.

Prepare three vials. Place 1.0 g of canola oil in the first; in a second vial place 1.0 g of the oleic acid (95%), and in a third and final vial place 1.0 g of the squalene (99.9%). To each vial add 1 g of the fluid to be tested for lipophilicity. Separately mix at room temperature and pressure each vial containing the lipophilic soil and the fluid to be tested for 20 seconds on a standard vortex mixer at maximum setting. Place vials on the bench and allow settling for 15 minutes at room temperature and pressure. If, upon standing, a single phase is formed in any of the vials containing lipophilic soils, then the fluid qualifies as suitable for use as a "lipophilic fluid" in accordance with the invention. However, if two or more separate layers are formed in all three vials, then the amount of fluid dissolved in the oil phase will need to be further determined before rejecting or accepting the fluid as qualified.

In such a case, with a syringe, carefully extract a 200 microliter sample from each layer in each vial. The syringe-extracted layer samples are placed in GC autosampler vials and subjected to conventional GC analysis after determining the retention time of calibration samples of each of the three models soils and the fluid being tested. If more than 1% of the test fluid by GC, preferably greater, is found to be present in any one of the layers which consists of the oleic acid, canola oil or squalene layer, then the test fluid is also qualified for use as a lipophilic fluid. If needed, the method can be further calibrated using heptacosafluorotributylamine, i.e., Fluorinert FC-43 (fail) and cyclopentasiloxane (pass).

A suitable GC is a Hewlett Packard Gas Chromatograph HP5890 Series II equipped with a split/splitless injector and FID. A suitable column used in determining the amount of lipophilic fluid present is a J&W Scientific capillary column DB-1HT, 30 meter, 0.25 mm id, 0.1 um film thickness cat# 1221131. The GC is suitably operated under the following conditions:

Carrier Gas: Hydrogen
Column Head Pressure: 9 psi
Flows:
  Column Flow @ ~1.5 ml/min.
  Split Vent @ ~250–500 ml/min.
  Septum Purge @ 1 ml/min.
Injection: HP 7673 Autosampler, 10 ul syringe, 1 ul injection
Injector Temperature: 350° C.
Detector Temperature: 380° C.
Oven Temperature Program:
  initial 60° C., hold 1 min.
  rate 25° C./min.
  final 380° C. hold 30 min.

Preferred lipophilic fluids suitable for use herein can further be qualified for use on the basis of having an excellent garment care profile. Garment care profile testing is well known in the art and involves testing a fluid to be qualified using a wide range of garment or fabric article components, including fabrics, threads and elastics used in seams, etc., and a range of buttons. Preferred lipophilic fluids for use herein have an excellent garment care profile, for example they have a good shrinkage or fabric puckering profile and do not appreciably damage plastic buttons.

For purposes of garment care testing or other qualification, e.g., flammability, a lipophilic fluid for use in the lipophilic fluid can be present in a mixture, e.g., with water, at approximately the ratio to be used in the final lipophilic fluid which will come into contact with fabric articles. Certain materials, which remove sebum, qualify for use as lipophilic fluids; for example, ethyl lactates can be quite objectionable in their tendency to dissolve buttons, and if such a material is to be used in the lipophilic fluid, it will be formulated with water and/or other solvents such that the overall mix is not substantially damaging to buttons. Other lipophilic fluids, D5 for example, meets the garment care requirements commendably. Some suitable lipophilic fluids may be found in granted U.S. Pat. Nos. 5,865,852; 5,942,007; 6,042,617; 6,042,618; 6,056,789; 6,059,845; and 6,063,135, which are herein incorporated by reference.

Lipophilic solvents can include linear and cyclic polysiloxanes, hydrocarbons and chlorinated hydrocarbons. More preferred are the linear and cyclic polysiloxanes and hydrocarbons of the glycol ether, acetate ester, lactate ester families. Preferred lipophilic solvents include cyclic siloxanes having a boiling point at 760 mm Hg. of below about 250° C. Specifically preferred cyclic siloxanes for use in this invention are octamethylcyclotetrasiloxane, decamethylcyclopentasiloxane, and dodecamethylcyclohexasiloxane. Preferably, the cyclic siloxane comprises decamethylcyclopentasiloxane (D5, pentamer) and is substantially free of octamethylcyclotetrasiloxane (tetramer) and dodecamethylcyclohexasiloxane (hexamer).

However, it should be understood that useful cyclic siloxane mixtures might contain, in addition to the preferred cyclic siloxanes, minor amounts of other cyclic siloxanes including octamethylcyclotetrasiloxane and hexamethylcyclotrisiloxane or higher cyclics such as tetradecamethylcycloheptasiloxane. Generally the amount of these other cyclic siloxanes in useful cyclic siloxane mixtures will be less than about 10 percent based on the total weight of the mixture. The industry standard for cyclic siloxane mixtures is that such mixtures comprise less than about 1% by weight of the mixture of octamethylcyclotetrasiloxane.

Accordingly, the lipophilic fluid of the present invention preferably comprises more than about 50%, more preferably more than about 75%, even more preferably at least about 90%, most preferably at least about 95% by weight of the lipophilic fluid of decamethylcyclopentasiloxane. Alternatively, the lipophilic fluid may comprise siloxanes which are a mixture of cyclic siloxanes having more than about 50%, preferably more than about 75%, more preferably at least about 90%, most preferably at least about 95% up to about 100% by weight of the mixture of decamethylcyclopentasiloxane and less than about 10%, preferably less than about 5%, more preferably less than about 2%, even more preferably less than about 1%, most preferably less than about 0.5% to about 0% by weight of the mixture of octamethylcyclotetrasiloxane and/or dodecamethylcyclohexasiloxane.

Bleaching System

The compositions of the present invention comprise a bleaching system. Bleaching systems typically comprise a "bleaching agent" (source of hydrogen peroxide) and an "initiator" or "catalyst". When present, bleaching agents will typically be at levels of from about 1%, preferably from about 5%, to about 30%, preferably to about 20% by weight of the composition. If present, the amount of bleach activator will typically be from about 0.1%, preferably from about 0.5%, to about 60%, preferably to about 40%, by weight, of the bleaching composition comprising the bleaching agent and bleach activator.

Bleaching Agents

Hydrogen peroxide sources are described in detail in the herein incorporated Kirk Othmer's Encyclopedia of Chemical Technology, 4th Ed (1992, John Wiley & Sons), Vol. 4, pp. 271–300 "Bleaching Agents (Survey)", and include the various forms of sodium perborate and sodium percarbonate, including various coated and modified forms.

The preferred source of hydrogen peroxide used herein can be any convenient source, including hydrogen peroxide itself. For example, perborate, e.g., sodium perborate (any hydrate but preferably the mono- or tetra-hydrate), sodium carbonate peroxyhydrate or equivalent percarbonate salts, sodium pyrophosphate peroxyhydrate, urea peroxyhydrate, or sodium peroxide can be used herein. Also useful are sources of available oxygen such as persulfate bleach (e.g., OXONE, manufactured by DuPont). Sodium perborate monohydrate and sodium percarbonate are particularly preferred. Mixtures of any convenient hydrogen peroxide sources can also be used.

A preferred percarbonate bleach comprises dry particles having an average particle size in the range from about 500 micrometers to about 1,000 micrometers, not more than about 10% by weight of said particles being smaller than about 200 micrometers and not more than about 10% by weight of said particles being larger than about 1,250 micrometers. Optionally, the percarbonate can be coated with a silicate, borate or water-soluble surfactants. Percarbonate is available from various commercial sources such as FMC, Solvay and Tokai Denka.

Compositions of the present invention may also comprise as the bleaching agent a chlorine-type bleaching material. Such agents are well known in the art, and include for example sodium dichloroisocyanurate ("NaDCC"). However, chlorine-type bleaches are less preferred for compositions which comprise enzymes.

(a) Bleach Activators

Preferably, the peroxygen bleach component in the composition is formulated with an activator (peracid precursor). The activator is present at levels of from about 0.01%, preferably from about 0.5%, more preferably from about 1% to about 15%, preferably to about 10%, more preferably to about 8%, by weight of the composition. Preferred activators are selected from the group consisting of tetraacetyl ethylene diamine (TAED), benzoylcaprolactam (BzCL), 4-nitrobenzoylcaprolactam, 3-chlorobenzoylcaprolactam, benzoyloxybenzenesulphonate (BOBS), nonanoyloxybenzene-sulphonate (NOBS), phenyl benzoate (PhBz), decanoyloxybenzenesulphonate ($C_{10}$-OBS), benzoylvalerolactam (BZVL), octanoyloxybenzenesulphonate ($C_8$-OBS), perhydrolyzable esters and mixtures thereof, most preferably benzoylcaprolactam and benzoylvalerolactam. Particularly preferred bleach activators in the pH range from about 8 to about 9.5 are those selected having an OBS or VL leaving group.

Preferred hydrophobic bleach activators include, but are not limited to, nonanoyloxybenzenesulphonate (NOBS), 4-[N-(nonaoyl) amino hexanoyloxy]-benzene sulfonate sodium salt (NACA-OBS) an example of which is described in U.S. Pat. No. 5,523,434, dodecanoyloxybenzenesulphonate (LOBS or $C_{12}$-OBS), 10-undecenoyloxybenzenesulfonate (UDOBS or $C_{11}$-OBS with unsaturation in the 10 position), and decanoyloxybenzoic acid (DOBA).

Preferred bleach activators are those described in U.S. Pat. No. 5,698,504 Christie et al., issued Dec. 16, 1997; U.S. Pat. No. 5,695,679 Christie et al. issued Dec. 9, 1997; U.S. Pat. No. 5,686,401 Willey et al., issued Nov. 11, 1997; U.S. Pat. No. 5,686,014 Hartshorn et al., issued Nov. 11, 1997; U.S. Pat. No. 5,405,412 Willey et al., issued Apr, 11, 1995; U.S. Pat No. 5,405,413 Willey et al., issued Apr. 11, 1995; U.S. Pat. No. 5,130,045 Mitchel et al., issued Jul. 14, 1992; and U.S. Pat. No. 4,412,934 Chung et al., issued Nov. 1, 1983, and copending patent applications U.S. Ser. Nos. 08/709,072, 08/064,564, all of which are incorporated herein by reference.

The mole ratio of peroxygen bleaching compound (as AvO) to bleach activator in the present invention generally ranges from at least 1:1, preferably from about 20:1, more preferably from about 10:1 to about 1:1, preferably to about 3:1.

Quaternary substituted bleach activators may also be included. The present laundry compositions preferably comprise a quaternary substituted bleach activator (QSBA) or a quaternary substituted peracid (QSP); more preferably, the former. Preferred QSBA structures are further described in U.S. Pat. No. 5,686,015 Willey et al., issued Nov. 11, 1997; U.S. Pat. No. 5,654,421 Taylor et al., issued Aug. 5, 1997; U.S. Pat. No. 5,460,747 Gosselink et al., issued Oct. 24, 1995; U.S. Pat. No. 5,584,888 Miracle et al., issued Dec. 17, 1996; and U.S. Pat. No. 5,578,136 Taylor et al., issued Nov. 26, 1996; all of which are incorporated herein by reference.

Highly preferred bleach activators useful herein are amide-substituted as described in U.S. Pat. No. 5,698,504, U.S. Pat. No. 5,695,679, and U.S. Pat. No. 5,686,014 each of which are cited herein above. Preferred examples of such bleach activators include: (6-octanamidocaproyl) oxybenzenesulfonate, (6-nonanamidocaproyl) oxybenzenesulfonate, (6-decanamidocaproyl) oxybenzenesulfonate and mixtures thereof.

Other useful activators, disclosed in U.S. Pat. No. 5,698,504, U.S. Pat. No. 5,695,679, U.S. Pat. No. 5,686,014 each of which is cited herein above and U.S. Pat. No. 4,966,723 Hodge et al., issued Oct. 30, 1990, include benzoxazin-type activators, such as a $C_6H_4$ ring to which is fused in the 1,2-positions a moiety ——C(O)OC($R^1$)=N—.

Depending on the activator and precise application, good bleaching results can be obtained from bleaching systems having with in-use pH of from about 6 to about 13, preferably from about 9.0 to about 10.5. Typically, for example, activators with electron-withdrawing moieties are used for near-neutral or sub-neutral pH ranges. Alkalis and buffering agents can be used to secure such pH. In addition, pH control may decrease or eliminate the need for a separate oxygen source in order to achieve good bleach efficacy.

Acyl lactam activators, as described in U.S. Pat. No. 5,698,504, U.S. Pat. No. 5,695,679 and U.S. Pat. No. 5,686,014, each of which is cited herein above, are very useful herein, especially the acyl caprolactams (see for example WO 94-28102 A) and acyl valerolactams (see U.S. Pat. No. 5,503,639 Willey et al., issued Apr. 2, 1996 incorporated herein by reference).

(b) Organic Peroxides, Especially Diacyl Peroxides

These are extensively illustrated in Kirk Othmer, Encyclopedia of Chemical Technology, Vol. 17, John Wiley and Sons, 1982 at pages 27–90 and especially at pages 63–72, all incorporated herein by reference. If a diacyl peroxide is used, it will preferably be one which exerts minimal adverse impact on spotting/filming.

(c) Metal-containing Bleach Catalysts

The present invention compositions and methods may utilize metal-containing bleach catalysts that are effective for use in bleaching compositions. Preferred are manganese and cobalt-containing bleach catalysts. Further, transition metals cations of defined bleach catalytic activity as described below may decrease or eliminate the need for a separate oxygen source. Alternatively, a separate oxygen source may be provided in conjunction with these cation catalysts in order to boost bleach performance or reduce required bleach concentrations.

One type of metal-containing bleach catalyst is a catalyst system comprising a transition metal cation of defined bleach catalytic activity, such as copper, iron, titanium, ruthenium tungsten, molybdenum, or manganese cations, an auxiliary metal cation having little or no bleach catalytic activity, such as zinc or aluminum cations, and a sequestrate having defined stability constants for the catalytic and auxiliary metal cations, particularly ethylenediaminetetraacetic acid, ethylenediaminetetra (methylenephosphonic acid) and water-soluble salts thereof. Such catalysts are disclosed in U.S. Pat. No. 4,430,243 Bragg, issued Feb. 2, 1982.

Manganese Metal Complexes

If desired, the compositions herein can be catalyzed by means of a manganese compound. Such compounds and levels of use are well known in the art and include, for example, the manganese-based catalysts disclosed in U.S. Pat. Nos. 5,576,282; 5,246,621; 5,244,594; 5,194,416; and 5,114,606; and European Pat. App. Pub. Nos. 549,271 A1, 549,272 A1, 544,440 A2, and 544,490 A1; Preferred examples of these catalysts include $Mn^{IV}_2(u-O-)_3(1,4,7$-trimethyl-1,4,7-triazacyclononane$)_2(PF_6)_2$, $Mn^{III}_2(u-O-)_1(u-OAc)_2(1,4,7$-trimethyl- 1,4,7triazacyclononane$)_2(ClO_4)_2$, $Mn^{IV}_4(u-O-)_6(1,4,7$-triazacyclononane$)_4(ClO_4)_4$, $Mn^{III}-Mn^{IV}_4(u-O-)_1(u-OAc)_2-(1,4,7$-trimethyl-1,4,7-triazacyclononane$)_2(ClO_4)_3$, $Mn^{IV}(1,4,7,$-trimethyl-1,4,7-triazacyclononane)- $(OCH_3)_3(PF_6)$, and mixtures thereof. Other metal-based bleach catalysts include those disclosed in U.S. Pat. Nos. 4,430,243 and U.S. Pat. No. 5,114,611. The use of manganese with various complex ligands to enhance bleaching is also reported in the following: U.S. Pat. Nos. 4,728,455; 5,284,944; 5,246,612; 5,256,779; 5,280,117; 5,274,147; 5,153,161; and 5,227,084.

Cobalt Metal Complexes

Cobalt bleach catalysts useful herein are known, and are described, for example, in U.S. Pat. Nos. 5,597,936; 5,595,967; and 5,703,030; and M. L. Tobe, "Base Hydrolysis of Transition-Metal Complexes", *Adv. Inorg. Bioinorg. Mech.*, (1983), 2, pages 1–94. The most preferred cobalt catalyst useful herein are cobalt pentaamine acetate salts having the formula $[Co(NH_3)_5OAc] T_y$, wherein "OAc" represents an acetate moiety and "$T_y$" is an anion, and especially cobalt pentaamine acetate chloride, $[Co(NH_3)_5OAc]Cl_2$; as well as $[Co(NH_3)_5OAc](OAc)_2$; $[Co(NH_3)_5OAc](PF_6)_2$; $[Co(NH_3)_5OAc](SO_4)$; $[Co(NH_3)_5OAc](BF_4)_2$; and $[Co(NH_3)_5OAc](NO_3)_2$ (herein "PAC").

These cobalt catalysts are readily prepared by known procedures, such as taught for example in U.S. Pat. Nos. 5,597,936; 5,595,967; and 5,703,030; in the Tobe article and the references cited therein; and in U.S. Pat. No. 4,810,410; *J. Chem. Ed.* (1989), 66 (12), 1043-45; The Synthesis and Characterization of Inorganic Compounds, W. L. Jolly (Prentice-Hall; 1970), pp. 461–3; *Inorg. Chem.*, 18, 1497–1502 (1979); *Inorg. Chem.*, 21, 2881–2885 (1982); *Inorg. Chem.*, 18, 2023–2025 (1979); Inorg. Synthesis, 173-176 (1960); and *Journal of Physical Chemistry*, 56, 22–25 (1952).

Transition Metal Complexes of Macropolycyclic Rigid Ligands

Compositions herein may also suitably include as bleach catalyst a transition metal complex of a macropolycyclic rigid ligand. The amount used is a catalytically effective amount, suitably about 1 ppb or more, for example up to about 99.9%, more typically about 0.001 ppm or more, preferably from about 0.05 ppm to about 500 ppm (wherein "ppb" denotes parts per billion by weight and "ppm" denotes parts per million by weight).

Transition-metal bleach catalysts of Macrocyclic Rigid Ligands which are suitable for use in the invention compositions can in general include known compounds where they conform with the definition herein, as well as, more preferably, any of a large number of novel compounds expressly designed for the present laundry or laundry uses, and non-limitingly illustrated by any of the following:

Dichloro-5,12-dimethyl-1,5,8,12-tetraazabicyclo[6.6.2]hexadecane Manganese(II)

Dichloro-5,12-diethyl-1,5,8,12-tetraazabicyclo[6.6.2]hexadecane Manganese(II)

Diaquo-5,12-dimethyl-1,5,8,12-tetraazabicyclo[6.6.2]hexadecaneManganese(II) Hexafluorophosphate Diaquo-5,12-diethyl-1,5,8,12-tetraazabicyclo[6.6.2]hexadecaneManganese(II) Hexafluorophosphate Aquo-hydroxy-5,12-dimethyl-1,5,8,12-tetraazabicyclo[6.6.2]hexadecane Manganese(III) Hexafluorophosphate Diaquo-5,12-dimethyl-1,5,8,1 2-tetraazabicyclo[6.6.2]hexadecaneManganese(II) Tetrafluoroborate Dichloro-5,12-dimethyl-1,5,8,12 tetraazabicyclo[6.6.2]hexadecane Manganese(III) Hexafluorophosphate Dichloro-5,12-diethyl-1,5,8,12-tetraazabicyclo[6.6.2]hexadecaneManganese(III) Hexafluorophosphate Dichloro-5,12-di-n-butyl-1,5,8,12-tetraaza bicyclo[6.6.2]hexadecane Manganese(II)

Dichloro-5,12-dibenzyl-1,5,8,1 2-tetraazabicyclo[6.6.2]hexadecaneManganese(II)

Dichloro-5-n-butyl-12-methyl-1,5,8,12-tetraaza-bicyclo[6.6.2]hexadecane Manganese(II)

Dichloro-5-n-octyl-12-methyl-1,5,8,12-tetraaza-bicyclo[6.6.2]hexadecane Manganese(II)

Dichloro-5-n-butyl-12-methyl-1,5,8,12-tetraaza-bicyclo[6.6.2]hexadecane Manganese(II).

As a practical matter, and not by way of limitation, the compositions and laundry processes herein can be adjusted to provide on the order of at least one part per hundred million of the active bleach catalyst species in the aqueous washing medium, and will preferably provide from about 0.01 ppm to about 25 ppm, more preferably from about 0.05 ppm to about 10 ppm, and most preferably from about 0.1 ppm to about 5 ppm, of the bleach catalyst species in the wash liquor. In order to obtain such levels in the wash liquor of an automatic washing process, typical compositions herein will comprise from about 0.0005% to about 0.2%, more preferably from about 0.004% to about 0.08%, of bleach catalyst, especially manganese or cobalt catalysts, by weight of the bleaching compositions.

(d) Other Bleach Catalysts

The compositions herein may comprise one or more other bleach catalysts. Preferred bleach catalysts are zwitterionic bleach catalysts, which are described in U.S. Pat. No. 5,576,282 (especially 3-(3,4-dihydroisoquinolinium) propane sulfonate. Other bleach catalysts include cationic bleach catalysts are described in U.S. Pat. Nos. 5,360,569, 5,442,066, 5,478,357, 5,370,826, 5,482,515, 5,550,256, and WO 95/13351, WO 95/13352, and WO 95/13353.

(e) Bleach Boosting Compounds

The compositions herein may comprise one or more bleach boosting compounds. Bleach boosting compounds provide increased bleaching effectiveness in lower temperature applications. The bleach boosters act in conjunction with conventional peroxygen bleaching sources to provide increased bleaching effectiveness.

Suitable bleach boosting compounds for use in accordance with the present invention comprise cationic imines, zwitterionic imines, anionic imines and/or polyionic imines having a net charge of from about +3 to about −3, and mixtures thereof. These imine bleach boosting compounds of the present invention include those of the general structure:

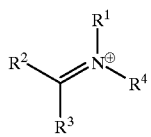
[I]

where $R^1$–$R^4$ may be a hydrogen or an unsubstituted or substituted radical selected from the group consisting of phenyl, aryl, heterocyclic ring, alkyl and cycloalkyl radicals.

Preferred bleach boosting compounds include where $R^1$–$R^4$ may be a hydrogen or an unsubstituted or substituted radical selected from the group consisting of phenyl, aryl, heterocyclic ring, alkyl and cycloalkyl radicals except that at least one of $R^1$–$R^4$ contains an anionically charged moiety.

More preferred bleach boosting compounds include the anionically charged moiety bonded to the imine nitrogen. Such bleach boosting compounds comprise quaternary imine zwitterions represented by the formula:

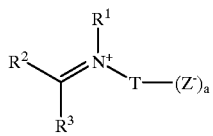
[II]

wherein $R^1$–$R^3$ is hydrogen or an unsubstituted or substituted radical selected from the group consisting of phenyl, aryl, heterocyclic ring, alkyl and cycloalkyl radicals; $R_1$ and $R_2$ form part of a common ring; T has the formula:

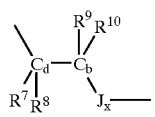

wherein x is equal to 0 or 1; J, when present, is selected from the group consisting of
$CR^{11}R^{12}$—, —$CR^{11}R^{12}CR^{13}R^{14}$—, and —$CR^{11}R^{12}CR^{13}R^{14}CR^{15}R^{16}$—; $R^7$—$R^{16}$ are individually selected from the group consisting of H, linear or branched $C_1$–$C_{18}$ substituted or unsubstituted alkyl, alkylene, oxyalkylene, aryl, substituted aryl, substituted arylcarbonyl groups and amide groups; Z is covalently bonded to $J_x$ when x is 1 and to $C_b$ when x is 0, and Z is selected from the group consisting of —$CO_2^-$, —$SO_3^-$ and —$OSO_3^-$ and a is 1. $R_1$ and $R_2$ together may form the non-charged moiety:

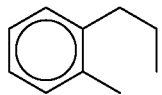

Most preferred bleach boosting compounds include are aryliminium zwitterions wherein $R_3$ is H, Z is —$SO_3^-$ or —$OSO_3^-$, and a is 1. The aryliminium zwitterions may have the formula:

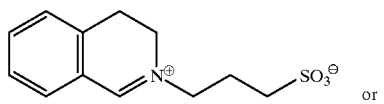
or

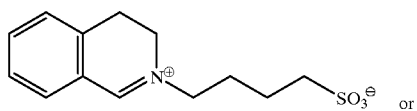
or

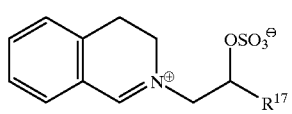

where $R^{17}$ is selected from the group consisting of H and linear or branched $C_1$–$C_{18}$ substituted or unsubstituted alkyl, preferably $C_1$–$C_{14}$ alkyl and even more preferably $C_8$–$C_{10}$ linear alkyl chain.

The bleach boosting compounds may also comprise an aryliminum polyion having a net negative charge and $R^3$ is H, T is —$(CH_2)_b$— or —$CH_2(C_6H_4)$—, Z is —$SO_3^-$, a is 2 and b is from 2 to 4. The aryliminium polyion preferably has the formula:

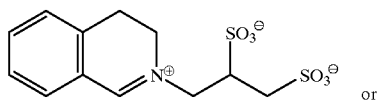
or

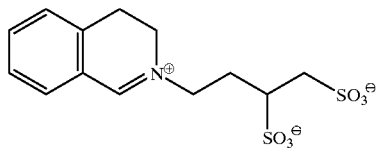

or is a water-soluble salt of these compounds.

The quaternary imine bleach boosting compounds preferably act in conjunction with a peroxygen source to provide a more effective bleaching system. The bleach boosting compounds react with the peroxygen source to form a more active bleaching species, an oxaziridinium compound. The formed oxaziridinium compounds are either cationic, zwitterionic or polyionic with a net negative charge as was the imine bleach boosting compound. The oxaziridinium compound has an increased activity at lower temperatures relative to the peroxygen compound. The oxaziridinium compound is represented by the formula:

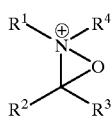

(III)

and can be produced from the imine of formula (I) or (II), wherein $R^4$ is T—$(Z^-)a$, of the present invention with the reaction:

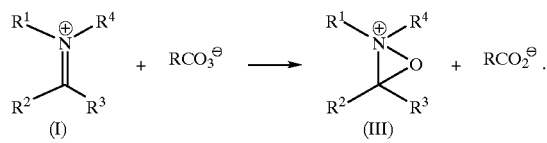

Thus, the preferred bleach boosting compounds of the present invention represented by the formula (II) produces the active oxaziridinium bleaching species represented by the formula:

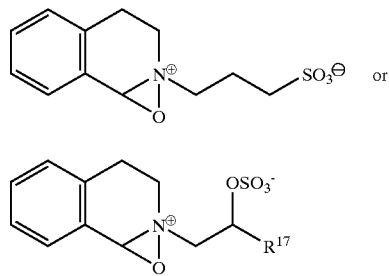

(IV)

or (V)

wherein $R^{17}$ is defined as above.

Peroxygen sources are well-known in the art and the peroxygen source employed in the present invention may comprise any of these well known sources, including peroxygen compounds as well as compounds which under consumer use conditions provide an effective amount of peroxygen in situ. The peroxygen source may include a hydrogen peroxide source, the in situ formation of a peracid anion through the reaction of a hydrogen peroxide source and a bleach activator, preformed peracid compounds or mixtures of suitable peroxygen sources. Of course, one of ordinary skill in the art will recognize that other sources of peroxygen may be employed without departing from the scope of the invention.

The bleach boosting compounds, when present, are preferably employed in conjunction with a peroxygen source in the bleaching compositions of the present invention. In such a composition, the peroxygen source is preferably present at a level of from about 0.1% to about 60% by weight of the composition, and more preferably from about 1% to about 40% by weight of the composition. In the composition, the bleach boosting compound is preferably present at a level of from about 0.01% to about 10% by weight of the composition, and more preferably from about 0.05% to about 5% by weight of the composition.

(f) Preformed Peracids

Also suitable as bleaching agents are preformed peracids, such as phthalimido-peroxy-caproic acid ("PAP"). See for example U.S. Pat. Nos. 5,487,818, 5,310,934, 5,246,620, 5,279,757 and 5,132,431.

(g) Photobleaches

Suitable photobleaches for use in the treating compositions of the present invention include, but are not limited to, the photobleaches described in U.S. U.S. Pat. Nos. 4,217,105 and 5,916,481.

(h) Enzyme Bleaching

Enzymatic systems may be used as bleaching agents. The hydrogen peroxide may also be present by adding an enzymatic system (i.e. an enzyme and a substrate therefore) which is capable of generating hydrogen peroxide at the beginning or during the washing and/or rinsing process. Such enzymatic systems are disclosed in EP Patent Application 91202655.6 filed Oct. 9, 1991.

The present invention compositions and methods may utilize alternative bleach systems such as ozone. Bleaching with ozone may be accomplished by introducing ozone-containing gas having ozone content from about 20 to about 300 g/m$^3$ into the solution that is to contact the fabrics. The gas:liquid ratio in the solution should be maintained from about 1:2.5 to about 1:6. U.S. Pat. No. 5,346,588 describes a process for the utilization of ozone as an alternative to conventional bleach systems and is herein incorporated by reference.

Adjunct Ingredients

Adjunct materials can vary widely and can be used at widely ranging levels. For example, detersive enzymes such as proteases, amylases, cellulases, lipases and the like as well as bleach catalysts including the macrocyclic types having manganese or similar transition metals all useful in laundry and cleaning products can be used herein at very low, or less commonly, higher levels. Adjunct materials that are catalytic, for example enzymes, can be used in "forward" or "reverse" modes, a discovery independently useful from the specific appliances of the present invention. For example, a lipolase or other hydrolase may be used, optionally in the presence of alcohols as adjuncts, to convert fatty acids to esters, thereby increasing their solubility in the lipohilic fluid. This is a "reverse" operation, in contrast with the normal use of this hydrolase in water to convert a less water-soluble fatty ester to a more water-soluble material. In any event, any adjunct ingredient must be suitable for use in combination with the lipophilic fluid.

The compositions may comprise emulsifiers. Emulsifiers are well known in the chemical art. Essentially, an emulsifier acts to bring two or more insoluble or semi-soluble phases together to create a stable or semi-stable emulsion. It is preferred in the claimed invention that the emulsifier serves a dual purpose wherein it is capable of acting not only as an emulsifier but also as a treatment performance booster. For example, the emulsifier may also act as a surfactant thereby boosting cleaning performance. Both ordinary emulsifiers and emulsifier/surfactants are commercially available.

Some suitable cleaning additives include, but are not limited to, builders, surfactants, enzymes, bleach activators, bleach catalysts, bleach boosters, bleaches, alkalinity sources, antibacterial agents, colorants, perfumes, pro-perfumes, finishing aids, lime soap dispersants, composition malodor control agents, odor neutralizers, polymeric dye transfer inhibiting agents, crystal growth inhibitors, photobleaches, heavy metal ion sequestrants, anti-tarnishing agents, anti-microbial agents, anti-oxidants, anti-redeposition agents, soil release polymers, electrolytes, pH modifiers, thickeners, abrasives, divalent or trivalent ions, metal ion salts, enzyme stabilizers, corrosion inhibitors, diamines or polyamines and/or their alkoxylates, suds stabilizing polymers, solvents, process aids, fabric softening agents, optical brighteners, hydrotropes, suds or foam suppressors, suds or foam boosters, fabric softeners, antistatic agents, dye fixatives, dye abrasion inhibitors, anti-crocking agents, wrinkle reduction agents, wrinkle resistance agents, soil release polymers, soil repellency agents, sunscreen agents, anti-fade agents, and mixtures thereof.

The term "surfactant" conventionally refers to materials that are surface-active either in the water, the lipophilic fluid, or the mixture of the two. Some illustrative surfactants include nonionic, cationic and silicone surfactants as used in conventional aqueous detergent systems. Suitable nonionic surfactants include, but are not limited to:

a) Polyethylene oxide condensates of nonyl phenol and myristyl alcohol, such as in U.S. Pat. No. 4,685,930 Kasprzak; and b) fatty alcohol ethoxylates, R—(OCH$_2$CH$_2$)$_a$OH a=1 to 100, typically 12–40, R=hydrocarbon residue 8 to 20 C atoms, typically linear alkyl. Examples polyoxyethylene lauryl ether, with 4 or 23 oxyethylene groups; polyoxyethylene cetyl ether with 2, 10 or 20 oxyethylene groups; polyoxyethylene stearyl ether, with 2, 10, 20, 21 or 100 oxyethylene groups; polyoxyethylene (2), (10) oleyl ether, with 2 or 10 oxyethylene groups. Commercially available examples include, but are not limited to: ALFONIC, BRIJ, GENAPOL, NEODOL, SURFONIC, TRYCOL. See also U.S. Pat. No. 6,013,683 Hill et al.,.

Suitable cationic surfactants include, but are not limited to dialkyldimethylammonium salts having the formula:

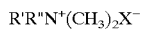

R'R"N$^+$(CH$_3$)$_2$X$^-$

Where each R'R" is independently selected from the group consisting of 12–30 C atoms or derived from tallow, coconut oil or soy, X=Cl or Br, Examples include: didodecyldimethylammonium bromide (DDAB), dihexadecyldimethyl ammonium chloride, dihexadecyldimethyl ammonium bromide, dioctadecyldimethyl ammonium chloride, dieicosyldimethyl ammonium chloride, didocosyldimethyl ammonium chloride, dicoconutdimethyl ammonium chloride, ditallowdimethyl ammonium bromide (DTAB). Commercially available examples include, but are not limited to: ADOGEN, ARQUAD, TOMAH, VARIQUAT. See also U.S. Pat. No. 6,013,683 Hill et al., .

Suitable silicone surfactants include, but are not limited to the polyalkyleneoxide polysiloxanes having a dimethyl polysiloxane hydrophobic moiety and one or more hydrophilic polyalkylene side chains and have the general formula:

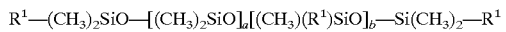

R$^1$—(CH$_3$)$_2$SiO—[(CH$_3$)$_2$SiO]$_a$[(CH$_3$)(R$^1$)SiO]$_b$—Si(CH$_3$)$_2$—R$^1$ wherein a+b are from about 1 to about 50, preferably from about 3 to about 30, more preferably from about 10 to about 25, and each R$^1$ is the same or different and is selected from the group consisting of methyl and a poly(ethyleneoxide/propyleneoxide) copolymer group having the general formula:

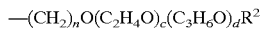

—(CH$_2$)$_n$O(C$_2$H$_4$O)$_c$(C$_3$H$_6$O)$_d$R$^2$ with at least one R$^1$ being a poly(ethyleneoxide/propyleneoxide) copolymer group, and wherein n is 3 or 4, preferably 3; total c (for all polyalkyleneoxy side groups) has a value of from 1 to about 100, preferably from about 6 to about 100; total d is from 0 to about 14, preferably from 0 to about 3; and more preferably d is 0; total c+d has a value of from about 5 to about 150, preferably from about 9 to about 100 and each R$^2$ is the same or different and is selected from the group consisting of hydrogen, an alkyl having 1 to 4 carbon atoms, and an acetyl group, preferably hydrogen and methyl group. Examples of these surfactants may be found in U.S. Pat. No. 5,705,562 Hill and U.S. Pat. No. 5,707,613 Hill, both of which are incorporated herein by reference.

Examples of this type of surfactants are the Silwet® surfactants which are available CK Witco, OSi Division, Danbury, Conn. Representative Silwet surfactants are as follows.

| Name | Average MW | Average a + b | Average total c |
|------|-----------|---------------|-----------------|
| L-7608 | 600 | 1 | 9 |
| L-7607 | 1,000 | 2 | 17 |
| L-77 | 600 | 1 | 9 |
| L-7605 | 6,000 | 20 | 99 |
| L-7604 | 4,000 | 21 | 53 |
| L-7600 | 4,000 | 11 | 68 |
| L-7657 | 5,000 | 20 | 76 |
| L-7602 | 3,000 | 20 | 29 |

The molecular weight of the polyalkyleneoxy group (R$^1$) is less than or equal to about 10,000. Preferably, the molecular weight of the polyalkyleneoxy group is less than or equal to about 8,000, and most preferably ranges from about 300 to about 5,000. Thus, the values of c and d can be those numbers which provide molecular weights within these ranges. However, the number of ethyleneoxy units (—C$_2$H$_4$O) in the polyether chain (R$^1$) must be sufficient to render the polyalkyleneoxide polysiloxane water dispersible or water soluble. If propyleneoxy groups are present in the polyalkylenoxy chain, they can be distributed randomly in the chain or exist as blocks. Preferred Silwet surfactants are L-7600, L-7602, L-7604, L-7605, L-7657, and mixtures thereof. Besides surface activity, polyalkyleneoxide polysiloxane surfactants can also provide other benefits, such as antistatic benefits, and softness to fabrics.

The preparation of polyalkyleneoxide polysiloxanes is well known in the art. Polyalkyleneoxide polysiloxanes of the present invention can be prepared according to the procedure set forth in U.S. Pat. No. 3,299,112, incorporated herein by reference.

Another suitable silicone surfactant is SF-1488, which is available from GE silicone fluids.

These and other surfactants suitable for use in combination with the lipophilic fluid as adjuncts are well known in the art, being described in more detail in Kirk Othmer's Encyclopedia of Chemical Technology, 3rd Ed., Vol. 22, pp. 360–379, "Surfactants and Detersive Systems", incorporated by reference herein. Further suitable nonionic detergent surfactants are generally disclosed in U.S. Pat. No. 3,929,678, Laughlin et al., issued Dec. 30, 1975, at column 13, line 14 through column 16, line 6, incorporated herein by reference.

The adjunct may also be an antistatic agent. Any suitable well-known antistatic agents used in laundering and dry cleaning art are suitable for use in the methods and compositions of the present invention. Especially suitable as antistatic agents are the subset of fabric softeners which are known to provide antistatic benefits. For example those fabric softeners which have a fatty acyl group which has an iodine value of above 20, such as N,N-di(tallowoyl-oxyethyl)-N,N-dimethyl ammonium methylsulfate. However, it is to be understood that the term antistatic agent is not to be limited to just this subset of fabric softeners and includes all antistatic agents.

Although the methods and/or compositions utilized in present invention will be described in detail, it should be understood, and one skilled in the art will recognize, that any compositions, processes, and/or apparati capable of carrying out the invention could be used.

Method

The method of the present invention is directed to attaining improved fabric cleaning in a lipophilic fluid treatment regimen, and includes the steps of exposing the fabric to a lipophilic fluid and exposing the fabric to a bleach system. Optionally but preferably, it may include the step of exposing the fabric to a polar component.

The polar component can be any water-miscible material including but not limited to water, alcohol, lower alcohols, glycols, glycol ethers, ethers, or mixtures thereof. The polar component is preferably in an amount of at least about 0.01%, more preferably at least about 0.05%, even more preferably at least about 0.1%, all by weight of fabric treating composition. Further, the polar component is preferably in an amount of at most about 25%, more preferably at most about 5%, even more preferably at most about 0.8%, all by weight of fabric treating composition.

The bleach system may include oxygen-based bleach, bleach activator and a peroxide source, pre-formed peracid, oxidative bleach enzyme, photo bleach, ozone, or mixtures of multiple bleach systems. If the bleach system comprises pre-formed peracid, the polar component preferably includes at least about 0.01% water by weight of composition. Preferably, the bleach system has at least about 1 ppm AvO, more preferably at least about 25 ppm AvO, even more preferably at least about 50 ppm AvO, even more preferably at least about 100 ppm AvO. Preferably, the bleach system has at most about 3000 ppm AvO, more preferably at most about 2000 ppm AvO. Most preferably, the bleach system has at least about 100 ppm AvO and at most about 500 ppm AvO. The bleach system may be within the polar component and/or within the lipophilic fluid as opposed to being a stand-alone system.

The lipophilic fluid may comprise a linear siloxane, a cyclic siloxane, or mixtures thereof. Preferably, the lipophilic fluid is selected from the group consisting essentially of octamethylcyclotetrasiloxane, decamethylcyclopentasiloxane, dodecamethylcyclohexasiloxane, and mixtures thereof. Even more preferably, the lipophilic fluid comprises decamethylcyclopentasiloxane. Most preferably, the lipophilic fluid comprises decamethylcyclopentasiloxane and is substantially free of octamethylcyclotetrasiloxane. Due to the flash points of the aforementioned siloxanes, the method preferably occurs at less than about 80° C.

While carrying out the method of the present invention, the fabrics may also be exposed to an emulsifier an/or a surfactant either separately or as a result of being contained within the polar component, the lipophilic fluid, and/or the bleach system. The fabrics may also be exposed to adjunct ingredients selected from the group consisting essentially of enzymes, bleaches, surfactants, emulsifiers, fabric softeners, perfumes, antibacterial agents, antistatic agents, brighteners, dye fixatives, dye abrasion inhibitors, anti-crocking agents, wrinkle reduction agents, wrinkle resistance agents, soil release polymers, sunscreen agents, anti-fade agents, builders, chelants, sudsing agents, composition malodor control agents, composition coloring agents, pH buffers, waterproofing agents, soil repellency agents, oxidative bleach enzyme, and mixtures thereof. These adjuncts can also be applied either separately or as a result of being contained within the polar component, the lipophilic fluid, and/or the bleach system.

Composition

The composition of the present invention is directed to attaining improved fabric cleaning in a lipophilic fluid treatment regimen, wherein the composition comprises a lipophilic fluid and a bleach system. Optionally, the composition can further comprise a polar component.

If included, the polar component can be any water-miscible material including but not limited to water, alcohol, lower alcohols, glycols, glycol ethers, ethers, or mixtures thereof. The polar component is preferably in an amount of at least about 0.01%, more preferably at least about 0.05%, even more preferably at least about 0.1%, all by weight of fabric treating composition. Further, the polar component is preferably in an amount of at most about 25%, more preferably at most about 5%, even more preferably at most about 0.8%, all by weight of fabric treating composition.

The bleach system may include oxygen-based bleach, bleach activator and a peroxide source, pre-formed peracid, oxidative bleach enzyme, photo bleach, ozone, or mixtures of multiple bleach systems. If the bleach system comprises pre-formed peracid, the polar component preferably includes at least about 0.01% water by weight of composition. Preferably, the bleach system has at least about 1 ppm AvO, more preferably at least about 25 ppm AvO, even more preferably at least about 50 ppm AvO, even more preferably at least about 100 ppm AvO. Preferably, the bleach system has at most about 3000 ppm AvO, more preferably at most about 2000 ppm AvO. Most preferably, the bleach system has at least about 100 ppm AvO and at most about 500 ppm AvO. The bleach system may be within the polar component and/or within the lipophilic fluid as opposed to being a stand-alone system.

The lipophilic fluid may comprise a linear siloxane, a cyclic siloxane, or mixtures thereof. Preferably, the lipophilic fluid comprises a lipophilic fluid selected from the group consisting essentially of octamethylcyclotetrasiloxane, decamethylcyclopentasiloxane, dodecamethylcyclohexasiloxane, and mixtures thereof. More preferably, the lipophilic fluid comprises decamethylcyclopentasiloxane. Most preferably, the lipophilic fluid comprises decamethylcyclopentasiloxane and is substantially free of octamethylcyclotetrasiloxane.

While carrying out the present invention, the fabrics may also be exposed to an emulsifier an/or a surfactant either separately or as a result of being contained within the polar component, the lipophilic fluid, and/or the bleach system. The fabrics may also be exposed to adjunct ingredients selected from the group consisting essentially of enzymes, bleaches, surfactants, emulsifiers, fabric softeners, perfumes, antibacterial agents, antistatic agents, brighteners, dye fixatives, dye abrasion inhibitors, anti-crocking agents, wrinkle reduction agents, wrinkle resistance agents, soil release polymers, sunscreen agents, anti-fade agents, builders, chelants, sudsing agents, composition malodor control agents, composition coloring agents, pH buffers, waterproofing agents, soil repellency agents, oxidative bleach enzyme, and mixtures thereof. These adjuncts can also be applied either separately or as a result of being contained within the polar component, the lipophilic fluid, and/or the bleach system.

It will be understood that the methods and/or compositions of the present invention may be combined with other fabric treatments. For example, prior to the application of the lipophilic fluid the fabric articles may be subjected to the particulate removal method described in co-pending application Ser. No. 60/191,965, to Noyes et al., filed Mar. 24, 2000, the relevant parts of which are incorporated herein by reference.

The present invention may be used in a service, such as a dry cleaning service, diaper service, uniform cleaning service, or commercial business, such as a Laundromat, dry cleaner, linen service which is part of a hotel, restaurant, convention center, airport, cruise ship, port facility, casino, or may be used in the home.

The methods and/or compositions of the present invention may be performed in an apparatus that is a modified existing apparatus and is retrofitted in such a manner as to conduct the process of the present invention in addition to related processes.

The methods and/or compositions of the present invention may also be performed in an apparatus, which is not a modified existing apparatus but is one specifically built in such a manner so as to conduct the process of the present invention or may be added to another apparatus as part of a lipophilic fluid processing system. This would include all the associated plumbing, such as connection to a chemical and water supply, and sewerage for waste wash fluids.

The methods of the present invention may also be performed in an apparatus capable of "dual mode" functions. A "dual mode" apparatus is one capable of both washing and drying fabrics within the same drum. These apparati are widely available, especially in Europe.

Finally, the methods of the present invention may be performed in an apparatus, which is not a modified existing apparatus but is one specifically built in such a manner so as to conduct the process of the present invention and related processes.

An apparatus used to carry out the present invention will typically contain some type of control system. These include electrical systems, such as, the so-called smart control systems, as well as more traditional electromechanical systems. The control systems would enable the user to select the size of the fabric load to be cleaned, the type of soiling, the extent of the soiling, the time for the cleaning cycle. Alternatively, the user could use pre-set cleaning and/or refreshing cycles, or the apparatus could control the length of the cycle, based on any number of ascertainable parameters. This would be especially true for electrical control systems. For example, when the collection rate of lipophilic fluid reaches a steady rate the apparatus could turn its self off after a fixed period of time, or initiate another process for the lipophilic fluid.

In the case of electrical control systems, one option is to make the control device a so-called "smart device". This could mean including, but not limited to, self diagnostic system, load type and cycle selection, linking the machine to the Internet and allowing for the consumer to start the apparatus remotely, be informed when the apparatus has cleaned a fabric article, or for the supplier to remotely diagnose problems if the apparatus should break down. Furthermore, if the apparatus of the present invention is only a part of a cleaning system, the so called "smart system" could be communicating with the other cleaning devices which would be used to complete the remainder of the cleaning process, such as a washing machine, and a dryer.

What is claimed is:

1. A method for attaining improved fabric cleaning in a lipophilic fluid treatment regimen, said method comprising the steps of:
   a. exposing said fabric to a lipophilic fluid; and
   b. exposing said fabric to a bleach system.

2. A method according to claim 1 further comprising the step of exposing said fabric to a polar component.

3. A method according to claim 2 wherein said polar component is selected from the group consisting essentially of water, alcohol, lower alcohols, glycols, glycol ethers, and combinations thereof.

4. A method according to claim 2 wherein said polar component comprises from at least about 0.01% to at most about 25% by weight of composition.

5. A method according to claim 2 wherein said polar component comprises from at least about 0.05% to at most about 5% by weight of composition.

6. A method according to claim 2 wherein said polar component comprises from at least about 0.01% to at most about 0.8% by weight of composition.

7. A method according to claim 1 wherein said bleach system is selected from the group consisting essentially of oxygen-based bleach, bleach activator and a peroxide source, pre-formed peracid, photo bleach, ozone, oxidative bleach enzyme, and combinations thereof.

8. A method according to claim 1 wherein said bleach system ha s from at least about 1 ppm AvO to at most about 3000 ppm AvO.

9. A method according to claim 1 wherein said bleach system has from at least about 100 ppm AvO and at most about 500 ppm AvO.

10. A method according to claim 1 wherein said lipophilic fluid comprises a linear siloxane, a cyclic siloxane, or mixtures thereof.

11. A method according to claim 1 wherein said lipophilic fluid comprises decamethylcyclopentasiloxane.

12. A method according to claim 1 wherein said fabric is also exposed to adjunct ingredients selected from the group consisting of enzymes, bleaches, surfactants, emulsifiers, fabric softeners, perfumes, antibacterial agents, antistatic agents, brighteners, dye fixatives, dye abrasion inhibitors, anti-crocking agents, wrinkle reduction agents, wrinkle resistance agents, soil release polymers, sunscreen agents, anti-fade agents, builders, chelants, sudsing agents, composition malodor control agents, composition coloring agents, pH buffers, waterproofing agents, soil repellency agents, oxidative bleach enzyme, and mixtures thereof.

13. A composition for attaining improved fabric cleaning in a lipophilic fluid treatment regimen, said composition comprising a lipophilic fluid, and a bleach system.

14. A composition according to claim 13 further comprising a polar component.

15. A composition according to claim 14 wherein said polar component is selected from the group consisting essentially of water, alcohol, lower alcohols, glycols, glycol ethers, and combinations thereof.

16. A composition according to claim 14 wherein said polar component comprises from at least about 0.01% to at most about 25% by weight of composition.

17. A composition according to claim 14 wherein said polar component comprises from at least about 0.05% to at most about 5% by weight of composition.

18. A composition according to claim 14 wherein said polar component comprises from at least about 0.1% to at most about 0.8% by weight of composition.

19. A composition according to claim 13 wherein said bleach system is selected from the group consisting essentially of oxygen-based bleach, bleach activator and a peroxide source, pre-formed peracid, photo bleach, ozone, oxidative bleach enzyme, and combinations thereof.

20. A composition according to claim 13 wherein said bleach system has from at least about 1 ppm AvO to at most about 3000 ppm AvO.

21. A composition according to claim 13 wherein said bleach system has from at least about 100 ppm AvO and at most about 500 ppm AvO.

22. A composition according to claim 13 wherein said lipophilic fluid comprises a linear siloxane, a cyclic siloxane, or mixtures thereof.

23. A composition according to claim 13 wherein said lipophilic fluid comprises decamethylcyclopentasiloxane.

24. A composition according to claim 13 comprising adjunct ingredients selected from the group consisting of enzymes, bleaches, emulsifiers, surfactants, fabric softeners, perfumes, antibacterial agents, antistatic agents, brighteners, dye fixatives, dye abrasion inhibitors, anti-crocking agents, wrinkle reduction agents, wrinkle resistance agents, soil release polymers, sunscreen agents, anti-fade agents, builders, chelants, sudsing agents, composition malodor control agents, composition coloring agents, pH buffers, waterproofing agents, soil repellency agents, oxidative bleach enzyme, and mixtures thereof.

* * * * *